United States Patent Office 3,808,166
Patented Apr. 30, 1974

3,808,166
PROCESS FOR REMOVING SOLVENT FROM EMULSIONS OF POLYMERIC SOLUTIONS
Mario Bruzzone and Giorgio Corradini, San Donato Milanese, and Valeria Fuga, Milan, Italy, assignors to Snam Progetti S.p.A., San Donato Milanese, Italy
No Drawing. Filed Apr. 16, 1971, Ser. No. 134,821
Claims priority, application Italy, Apr. 16, 1970, 23,390/70
Int. Cl. B01d 15/08; C08d 5/00
U.S. Cl. 260—29.7 PT                 4 Claims

ABSTRACT OF THE DISCLOSURE

A process is disclosed for preparing a polymeric latex from an aqueous emulsion of a solution of a polymer wherein the emulsion is brought into contact with a solid such as cured and cross-linked 1,4-cis-polybutadiene in a form which provides a high surface/volume ratio so that the solvent for the polymer is adsorbed by the solid which is then removed from the resulting latex. The process is carried out at a temperature which is below the boiling point of the solvent for the polymer and the solid used as an adsorbent is compatible with, but insoluble in, the solvent for the polymer and is incompatible with that polymer.

---

The present invention relates to a process for removing solvent from aqueous emulsions of polymeric solutions in order to obtain artificial polymeric latices constituted by a dispersion of polymer in water.

It is known that, for preparing polymeric latices, constituted by a stable dispersion of polymer in water, the solution of a polymer in a water insoluble solvent is emulsified with water in presence of surfactants, then the solvent is removed by distillation and the remaining polymeric dispersion free from solvent is utilized as such or concentrated. Said method for preparing the dispersion in water has the drawback that, during the solvent distillation step, because of the presence of surfactants which are necessary for giving the emulsion a sufficient stability, forms foam which prevents or makes difficult a complete solvent removal.

Object of the present invention is a process for removing partially or totally the solvent by adsorbing the same on a solid material, so avoiding the solvent distillation and the connected foaming problems. In said way two phases are obtained, the first one constituted by the absorbing solid imbued with solvent, which is then recovered by any one of the systems known in the art, the other one constituted by the dispersion of the polymer in water.

The solid imbued with solvent is taken away from the contact apparatus, so isolating the dispersion of polymer in water. The used solid material must be compatible with the solvent in order to absorb the same in a way as completely as possible and must be as incompatible as possible with the polymer of the solution in order to avoid the absorption of the same; said solid material must have such a surface per unit volume that the solvent absorption is easily carried out and such a chemical constitution that the highest amount of solvent is absorbed without clogging apparatus and making difficult solvent removal.

The absorbing material may be in the form of granules, strips, threads or of other shapes; it may be selected among cross-linked polymers and in particular among elastomers cross-linked by cure. There is no restriction to the type of solvent removable by means of the process object of the invention, said solvent being generally a hydrocarbon selected among aliphatic, cycloalkyl hydrocarbons or the like. The conditions of the solvent removal operation are a pressure near atmospheric and a temperature lower than the solvent boiling temperature at said pressure.

Some methods for removing solvent from polymeric emulsions according to the invention will now be described.

Latex containing solvent is made to percolate through a column containing the absorbing material which is insoluble in the solvent contained in the latex, compatible with the solvent and as incompatible as possible with the polymer contained in the solvent. During latex percolation the solvent transfers on and into the absorbing material which has a very high surface per unit volume; the latex free from solvent is tapped from the column bottom. Said operation can be preferably carried out in several columns in series, in any one of which a certain percentage of solvent is removed, obtaining from the last one latex substantially free from solvent.

Another process whereby the object of the present invention can be realized consists in contacting latex containing solvent with the absorbing material in a vessel provided with a stirrer, being possible to have also many vessels in series.

The solid absorbing material usable according to the invention can be selected, as aforesaid, among a wide class of compounds, i.e. among all the ones which have a good compatibility with the solvent to be removed and little compatibility with the polymer which constitutes the latex; for compatibility between two polymers in solution we mean that they have a density of cohesive energy very similar. (Scatchard G. Chem. Revs. 8, 321 (1931).

For illustrative purposes and without limiting the invention to them, we now give some examples reporting data obtained by means of the process according to the present invention.

EXAMPLE 1

We treated with 200 g. of cross-linked polybutadiene, having the hereinafter listed characteristics, in a vessel provided with a stirrer, 2000 cm.³ of an emulsion in water of a solution of cis-polyisoprene containing 6.8% by weight of solids. Said emulsion was obtained by stirring with a stirrer with a roto-stator system for 2 minutes at 4000 revolutions/minute and successively for 10 minutes at 7000 revolutions/minute a solution of polyisoprene in hexane having 11% by weight of polyisoprene together with an aqueous solution of Dresinate 214 having 1.8% by weight of Dresinate (Hercules Powder Co.). The ratio between the polyisoprene solution and the aqueous solution of Dresinate was 2/1. The characteristics and the type of the emulsified polymer were the following:

(1) polyisoprene having a linkage 1,4 cis >95%.
(2) toluene intrinsic viscosity of polyisoprene at 30° C.= 4.7/dcl./g.

Cured polybutadiene had the following characteristics and formulation:

| | |
|---|---|
| 1,4 cis-polybutadiene | 100 |
| Stearic acid | 2.5 |
| Zinc oxide | 5 |
| Antioxidant A02246 (American Cyanamid Co.) | 1 |
| NCBS special (Monsanto Company) | 1.1 |
| Sulphur | 1.3 |
| Cure temperature (° C.) | 145 |
| Cure time (minutes) | 75 |
| Obtained cross-linking density (moles/cm.$^3$) | $0.3 \cdot 10^{-4}$ |

Results obtained with the above-mentioned emulsion and cross-linked polymer after five consecutive treatments were the following:

| | Amount of hexane contained in the latex (percent by volume) |
|---|---|
| Start | 59 |
| After 1st treatment | 44 |
| After 2nd treatment | 26 |
| After 3rd treatment | 15 |
| After 4th treatment | 8 |
| After 5th treatment | Traces |

EXAMPLE 2

We treated in a vessel without stirrer a hexane solution of cis-polyisoprene obtained as described in Example 1 and containing 6.8% by weight of solids with 200 g. of cross-linked EPT (ethyl-propylene-diene terpolymer), ground to a size of 1 mm.$^3$, having the following characteristics and formulation:

| | |
|---|---|
| $\dfrac{C_2 \text{ (moles)}}{C_2+C_3 \text{ (moles)}}$ | 0.7 |
| Termonomer 1,4 hexadiene (percent by weight based on the polymer) | 3.7 |
| EPT | 100 |
| Stearic acid | 1 |
| Zinc oxide | 5 |
| Antioxidant A02246 | 1 |
| Vulkacit TMTD (Farbenfabriken Bayer A.G.) | 1.5 |
| Vulkacit MBT (Farbenfabriken Bayer A.G.) | 0.5 |
| Sulphur | 1.5 |
| Cure temperature (° C.) | 153 |
| Cure time (minutes) | 60 |
| Cross-linking density (moles/cm.$^3$) | $0.5 \cdot 10^{-4}$ |

Results obtained after eight consecutive treatments were the ones reported in the following table:

| | Amount of hexane contained in the latex (percent by volume) |
|---|---|
| Start | 59 |
| After 1st treatment | 45 |
| After 2nd treatment | 30 |
| After 3rd treatment | 19.7 |
| After 4th treatment | 12.5 |
| After 5th treatment | 8.2 |
| After 6th treatment | 6.1 |
| After 7th treatment | 5 |
| After 8th treatment | Traces |

EXAMPLE 3

In a vessel provided with a stirrer 2000 cm.$^3$ of an emulsion in water of a hexane solution of cis-polyisoprene, obtained as described in Example 1 and containing 6.8% by weight of solid, were treated with 200 g. of ethylene-propylene-diene terpolymer having the formulation shown in Example 2 and in the form of strips with a section having an area of 6–8 mm.$^2$. The latex was contacted with the terpolymer so as to obtain a change of the latex density of 0.05 g./cm.$^3$; afterwards the latex was transferred to a second vessel containing the same amount of cross-linked terpolymer. The operation was repeated in total five times, controlling after every step the amount of hexane contained in the latex. The obtained results were the following:

| | Amount of hexane contained in the latex (percent by volume) |
|---|---|
| Start | 59 |
| After 1st treatment | 43.5 |
| After 2nd treatment | 30.5 |
| After 3rd treatment | 17.5 |
| After 4th treatment | 7 |
| After 5th treatment | Traces |

What we claim is:

1. A process for removing partially or totally the hexane from emulsions in water of hexane solutions of cis-polyisoprene characterized in that the hexane is removed by absorption on cross-linked 1,4-cis-polybutadiene or cross-linked ethylene-propylene-diene terpolymer and that said cross-linked 1,4-cis-polybutadiene or cross-linked ethylene-propylene-diene terpolymer containing the solvent is separated from the system and the resulting dispersion of polymer in water is isolated.

2. Process as claimed in claim 1 wherein the solvent removal operation is carried out in a filled type column.

3. Process as claimed in claim 1 wherein the solvent removal operation is carried out in presence of a stirring action.

4. Process as claimed in claim 1 wherein the solid absorbing material is in the form of granules, or threads or of other shapes having a high surface/volume ratio.

References Cited

UNITED STATES PATENTS

| | | | |
|---|---|---|---|
| 2,974,178 | 3/1961 | Hwa et al. | 260—674 |
| 3,310,515 | 3/1967 | Halper et al. | 260—29.7 EM |
| 3,531,463 | 9/1970 | Gustafson | 210—24 |

ALLAN LIEBERMAN, Primary Examiner

T. DeBENEDICTIS, Sr., Assistant Examiner

U.S. Cl. X.R.

208—310; 210—24, 40; 260—29.7 EM, 674